(12) United States Patent
Ono et al.

(10) Patent No.: US 8,148,927 B2
(45) Date of Patent: Apr. 3, 2012

(54) ALTERNATING-CURRENT MOTOR CONTROL APPARATUS

(75) Inventors: Toshikazu Ono, Toyota (JP); Kenji Yamada, Toyota (JP); Toshifumi Yamakawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 305 days.

(21) Appl. No.: 12/692,971

(22) Filed: Jan. 25, 2010

(65) Prior Publication Data
US 2010/0194317 A1 Aug. 5, 2010

(30) Foreign Application Priority Data
Feb. 5, 2009 (JP) .................................. 2009-024900

(51) Int. Cl.
*H02P 27/08* (2006.01)
*H02P 21/00* (2006.01)
(52) U.S. Cl. .................... 318/400.02; 318/805; 318/811
(58) Field of Classification Search .................. 318/599, 318/800, 801, 805, 811, 700, 705, 400.02
See application file for complete search history.

(56) References Cited

U.S. PATENT DOCUMENTS

| | | | | |
|---|---|---|---|---|
| 6,781,333 | B2* | 8/2004 | Koide et al. | 318/432 |
| 7,723,945 | B2* | 5/2010 | Okamura | 318/805 |
| 2002/0180402 | A1* | 12/2002 | Koide et al. | 318/727 |
| 2005/0001582 | A1* | 1/2005 | Goto et al. | 318/802 |
| 2008/0218111 | A1* | 9/2008 | Okamura | 318/453 |
| 2009/0278483 | A1* | 11/2009 | Egami | 318/400.3 |
| 2010/0194330 | A1* | 8/2010 | Hayashi | 318/799 |
| 2011/0181231 | A1* | 7/2011 | Ito et al. | 318/801 |
| 2011/0248663 | A1* | 10/2011 | Yamakawa et al. | 318/805 |

FOREIGN PATENT DOCUMENTS

| JP | 2004023920 A | * | 1/2004 |
|---|---|---|---|
| JP | A-2004-23920 | | 1/2004 |
| JP | 2006014426 A | * | 1/2006 |
| JP | A-2006-74951 | | 3/2006 |
| JP | A-2008-11682 | | 1/2008 |

* cited by examiner

*Primary Examiner* — Eduardo Colon
(74) *Attorney, Agent, or Firm* — Oliff & Berridge, PLC (57) ABSTRACT

A control apparatus for an alternating-current motor that is driven by an inverter includes a rectangular wave voltage control portion that generates a control command of the inverter such that rectangular wave voltage that has been phase-controlled to make the alternating-current motor operate according to a torque command value is applied to the alternating-current motor; and a phase change control portion that controls a change in the phase to maintain the center of a flux linkage vector locus indicative of a change in a flux linkage of the alternating-current motor before and after a change in the phase of the rectangular wave voltage.

6 Claims, 10 Drawing Sheets

ALTERNATING-CURRENT MOTOR CONTROL APPARATUS

INCORPORATION BY REFERENCE

The disclosure of Japanese Patent Application No. 2009-024900 filed on Feb. 5, 2009 including the specification, drawings and abstract is incorporated herein by reference in its entirety.

BACKGROUND OF THE INVENTION

1. Field of the Invention

The invention relates to an alternating-current motor control apparatus, and more particularly, an alternating-current motor control apparatus that performs rectangular wave voltage control.

2. Description of the Related Art

In alternating-current motor control, rectangular wave voltage control that controls the torque by controlling the phase of rectangular wave voltage applied to an alternating-current motor is known.

Japanese Patent Application Publication No. 2006-74951 (JP-A-2006-74951) describes an alternating-current motor control apparatus that controls an inverter according to this kind of rectangular wave voltage control. In this control apparatus, phase error between an electrical angle target value and an electrical angle estimated value at the time of the next control calculation is corrected by a phase correction amount that corresponds to a current offset. This control apparatus reduces the difference in the voltage SW pattern switching timing due to phase detector error, thereby making it possible to suppress current offset.

Although the technology described in JP-A-2006-74951 does suppressing current offset by reducing the difference in the voltage SW pattern switching timing due to phase detector error, when the phase of the rectangular wave voltage changes following torque control, there may be a current offset before and after the phase changes.

SUMMARY OF THE INVENTION

In view of the foregoing problems, this invention provides a control apparatus for an alternating-current motor that is capable of suppressing offset current when changing the phase of rectangular wave voltage in rectangular wave voltage control.

A first aspect of the invention relates to a control apparatus for an alternating-current motor that is driven by an inverter. This control apparatus includes a rectangular wave voltage control portion and a phase change control portion. The rectangular wave voltage control portion generates a control command of the inverter such that rectangular wave voltage that has been phase-controlled to make the alternating-current motor operate according to a torque command value is applied to the alternating-current motor. The phase change control portion controls a change in the phase to maintain the center of a flux linkage vector locus indicative of a change in a flux linkage of the alternating-current motor before and after a change in the phase of the rectangular wave voltage.

The phase change control portion may be structured so as to be able to change the timing at which the phase is changed.

With this control apparatus for an alternating-current motor, a change in the phase of the rectangular wave voltage is controlled to maintain the center of a flux linkage vector locus before and after the change in the phase of the rectangular wave voltage. As a result, offset current can be suppressed when changing the phase of the rectangular wave voltage in rectangular wave voltage control.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Example embodiments of the present invention will be described in greater detail below with reference to the accompanying drawings. Incidentally, in the drawings, like reference characters represent like or corresponding parts.

Figure 1:
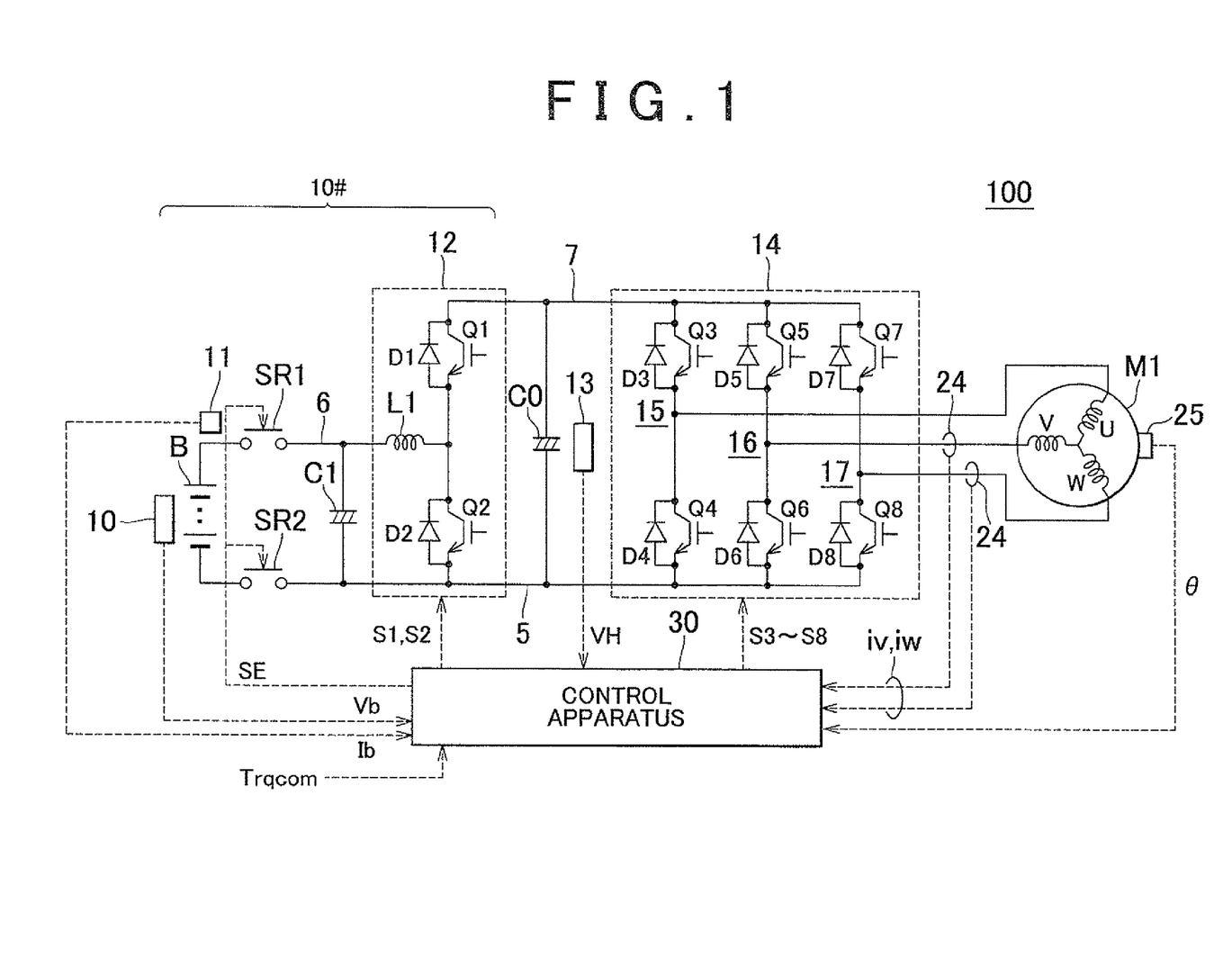
FIG. 1 is an overall block diagram of a motor drive system to which an alternating-current motor control apparatus according to a first example embodiment of the invention can be applied.

First, a first example embodiment of the invention will be described. FIG. 1 is an overall block diagram of a motor drive system to which an alternating-current motor control apparatus according to an example embodiment of the invention can be applied. Referring to FIG. 1, a motor drive system 100 includes a direct current voltage generating portion (hereinafter simply referred to as "DC voltage generating portion") 10#, a smoothing condenser C0, an inverter 14, an alternating-current motor (hereinafter simply referred to as "AC motor") M1, and a control apparatus 30.

The AC motor M1 is an electric motor for generating torque used to drive driving wheels of a vehicle powered partly or entirely by electricity (i.e., a vehicle that generates vehicle driving force using electric energy, such as a hybrid vehicle, an electric vehicle, or a fuel cell vehicle, and hereinafter simply referred to as "electric vehicle"). Alternatively, the AC motor M1 may be configured to function as a generator that is driven by an engine, or as both an electric motor and a generator. Moreover, the AC motor M1 may operate as a motor for the engine. For example, the AC motor M1 may be incorporated in a hybrid vehicle as a motor capable of starting the engine.

The DC voltage generating portion 10# includes a power storage device B, system relays SR1 and SR2, a smoothing condenser C1, and a converter 12. The power storage device B is representatively formed by an electric double layer capacitor or a secondary battery such as a nickel-metal-hydride battery or a lithium-ion battery. The DC voltage Vb output by the power storage device B is detected by a voltage sensor 10, and the DC current Ib input to and output from the power storage device B is detected by a current sensor 11. The system relay SR1 is connected between the positive terminal of the power storage device B and a power line 6. The system relay SR2 is connected between the negative terminal of the power storage device B and a ground wire 5. These system relays SR1 and SR2 are turned on and off by a signal SE from the control apparatus 30.

The converter 12 includes a reactor L1, power semiconductor switching elements Q1 and Q2, and diodes D1 and D2. The power semiconductor switching elements Q1 and Q2 are connected in series between a power line 7 and the ground wire 5. The power semiconductor switching elements Q1 and Q2 are controlled on and off by switching control signals S1 and S2 from the control apparatus 30.

Incidentally, an IGBT (Insulated Gate Bipolar Transistor), a power MOS (Metal Oxide Semiconductor) transistor, or a power bipolar transistor or the like may be used for each of the power semiconductor switching element (hereinafter simply referred to as a "switching element"). The switching element Q1 is provided with an antiparallel diode D1, and the switching element Q2 is provided with an antiparallel diode D2. The reactor L1 is connected between the power line 6 and the connecting nodes of the switching elements Q1 and Q2. Also, the smoothing condenser C0 is connected between the power line 7 and the ground wire 5.

The inverter 14 is formed of a U-phase upper/lower arm 15, a V-phase upper/lower arm 16, and a W-phase upper/lower arm 17, which are parallel to each other between the power line 7 and the ground wire 5. Each phase upper/lower arm is formed of switching elements that are connected in series between the power line 7 and the ground wire 5. For example, the U-phase upper/lower arm 15 is formed of switching elements Q3 and Q4, the V-phase upper/lower arm 16 is formed of switching elements Q5 and Q6, and the W-phase upper/lower arm 17 is formed of switching elements Q7 and Q8.

Also, these switching elements Q3 to Q8 are connected to antiparallel diodes D3 to D8, respectively. The switching elements Q3 to Q8 are controlled on and off by switching control signals S3 to S8 from the control apparatus 30.

Representatively, the AC motor M1 is a three-phase permanent magnet type synchronous motor in which one end of a U-phase coil, a V-phase coil, and a W-phase coil are commonly connected to a neutral point. Furthermore, the other end of each of coil is connected to a point midway between the switching elements of the corresponding phase upper/lower arm 15 to 17.

The converter 12 basically is controlled to complementarily and alternately turn the switching elements Q1 and Q2 on and off in each switching cycle. During a step-up operation, the converter 12 steps the voltage Vb supplied from the power storage device B up to the voltage VH. This step-up operation is performed by supplying electromagnetic energy stored in the reactor L1 while the switching element Q2 is on to the power line 7 via the switching element Q1 and the diode D1.

Also, during a step-down operation, the converter 12 steps the voltage VH down to the voltage Vb. This step-down operation is performed by supplying electromagnetic energy stored in the reactor L1 while the switching element Q1 is on to the power line 6 via the switching element Q2 and the diode D2. The voltage conversion ratio (i.e., the ratios of VH and Vb) in these step-up and step-down operations is controlled by the ratio of the on time of the switching elements Q1 and Q2 to the switching cycle (i.e., the duty ratio). Incidentally, VH may also be set equal to Vb (in which voltage conversion ratio=1.0) if the switching element Q1 is fixed ON and the switching element Q2 is fixed OFF.

The smoothing condenser C0 smoothes the DC voltage from the condenser 12 and supplies this smoothed DC voltage to the inverter 14. A voltage sensor 13 detects the voltage at both terminals of the smoothing condenser C0, i.e., the voltage VH, and outputs the detected value to the control apparatus 30.

When the torque command value of the AC motor M1 is positive (i.e., Trqcom>0), the inverter converts the DC voltage into AC voltage by a switching operation of the switching elements Q3 to Q8 in response to the switching control signals S3 to S8 from the control apparatus 30 and drives the AC motor M1 to output positive torque. Also, when the torque command value of the AC motor M1 is zero (i.e., Trqcom=0), the inverter 14 converts the DC voltage into AC voltage by the switching operation of the switching elements Q3 to Q8 in response to the switching control signals S3 to S8 and drives the AC motor M1 so that no torque is generated. Accordingly, the AC motor M1 is driven to generate either no torque or positive torque as specified by the torque command value Trqcom.

Moreover, during regenerative braking of the electric vehicle provided with the motor drive system 100, the torque command value Trqcom of the AC motor M1 is set to a negative value (i.e., Trqcom<0). In this case, the inverter 14 converts the AC voltage generated by the AC motor M1 into DC voltage by a switching operation in response to the switching control signals S3 to S8, and supplies that converted DC voltage to the converter 12. Incidentally, regenerative braking in this case includes both braking that accompanies regenerative power generation when there is a foot brake operation by a driver driving the electric vehicle, and deceleration of the vehicle (or stopping accelerating) while regenerating power by releasing the accelerator pedal while traveling even though the foot brake is not being depressed.

A current sensor 24 detects the motor current running through the AC motor M1 and outputs this detected motor current to the control apparatus 30. Incidentally, the sum of the instantaneous values of the three phase currents iu, iv, and iw is zero, so the current sensor 24 need only be arranged to detect the motor current of two phases (such as the V-phase current iv and the W-phase current iw).

A rotation angle sensor (i.e., a resolver) 25 detects the rotor rotation angle θ of the AC motor M1 and outputs that detected rotation angle θ to the control apparatus 30. The control apparatus 30 is able to calculate the rotation speed (rpm) and the angular velocity ω (rad/s) of the AC motor M1 based on the rotation angle θ. Incidentally, the rotation angle sensor 25 may also be omitted by having the control apparatus 30 calculate the rotation angle θ directly from the motor voltage or current.

The control apparatus 30 is formed of an electronic control unit (ECU) and controls the operation of the motor drive system 100 by software by executing a pre-stored program by a CPU, not shown, and/or by hardware according to a special electronic circuit. As a representative function, the control apparatus 30 controls the operation of the converter 12 and the inverter 14 so that the AC motor M1 outputs torque according to the torque command value Trqcom. That is, the control apparatus 30 generates the switching control signals S1 to S8 to control the converter 12 and the inverter 14, and outputs these switching control signals S1 to S8 to the converter 12 and the inverter 14.

Here, the control apparatus controls the operation of the inverter 14 by a rectangular wave voltage control method of applying a rectangular wave voltage in which the ratio of the high level time to the low level time within a predetermined switching cycle is basically 1:1 to an alternating-current motor. More specifically, the control apparatus 30 estimates the torque of the AC motor M1 from the detected values of the rotation angle θ and the motor currents iv and iw, and calculates the difference between the torque estimated value and the torque command value Trqcom. Then the control apparatus 30 controls the phase of the rectangular wave voltage according to the torque difference by performing a feedback calculation (such as a PI (proportional integral) calculation) according to that torque difference. More specifically, when there is positive torque (i.e., Trqcom>0), the voltage phase is advanced when the torque is insufficient and retarded when the torque is excessive. On the other hand, when there is negative torque (i.e., Trqcom<0), the voltage phase is retarded when the torque is insufficient and advanced when the torque is excessive. Then the control apparatus 30 generates a rectangular wave voltage command that has been phase-controlled as described above, and generates a switching control signal S3 to S8 to drive the inverter 14 based on that generated voltage command.

In this way, with rectangular wave voltage control, torque control is executed by controlling (i.e., changing) the phase of the rectangular wave voltage with respect to the rotation angle of the rotor. For example, the torque can be increased according to how much the voltage phase is advanced. Typically in a three-phase motor, each phase voltage is turned on/off once during one cycle of electrical angle, so the voltage phase can be controlled six times during one cycle of electrical angle.

However, when the voltage phase is updated once during one cycle of electrical angle, the ratio of the high level time to the low level time of the rectangular wave voltage of each phase becomes unbalanced, which results in an offset in the current before and after the phase update (hereinafter, this offset may also be referred to as a "offset current"). This offset current may cause overcurrent and vibration in the vehicle.

Figure 2:
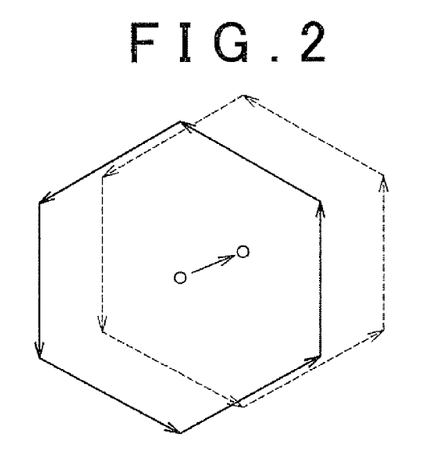
FIG. 2 is a view of a change in a flux linkage vector locus before and after a phase update when the voltage phase has been updated once during one cycle of electrical angle according to the first example embodiment.

FIG. 2 is a view of a change in a flux linkage vector locus before and after a phase update when the voltage phase has been updated once during one cycle of electrical angle. The solid line in FIG. 2 indicates the flux linkage vector locus before the phase update, and the dotted line in FIG. 2 indicates the flux linkage vector locus after the phase update. As is evident from the drawing, the center of the flux linkage vector locus after the voltage phase update is offset from the flux linkage vector locus before the voltage phase update. A continual offset of these centers means that there is a difference between the total voltage applied to the AC motor M1 by the inverter 14 after the phase update and the total voltage applied to the AC motor M1 by the inverter 14 before the phase update, and thus there is an offset current. That is, when the voltage phase is updated once during one cycle of electrical current, an offset current occurs.

Therefore, in this first example embodiment, the phase of the rectangular wave voltage is changed such that the center of the flux linkage vector locus after the phase update will not continue to be offset from the center of the flux linkage vector locus before the phase update.

Figure 3:
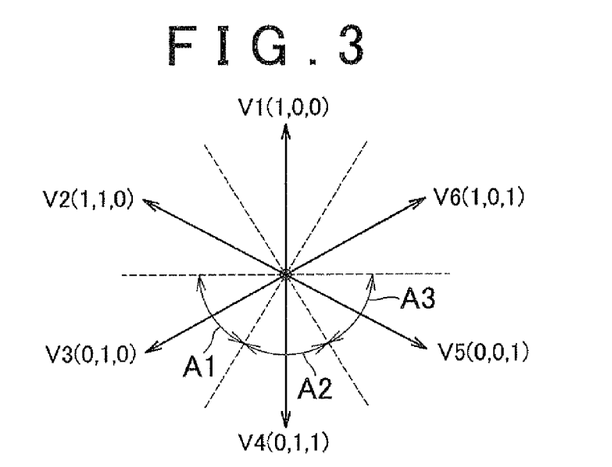
FIG. 3 is a view of voltage vectors of an inverter according to the first example embodiment.

FIG. 3 is a view of voltage vectors of the inverter 14. Referring to FIG. 3, voltage vector V1 corresponds to a case in which the upper arm of the U-phase arm 15 is on and the lower arms of the V-phase arm 16 and the W-phase arm 17 are also on. Incidentally, the three numbers in parentheses indicate the switching state of the U-phase arm 15, the V-phase arm 16, and the W-phase arm 17 in order from the left. A "1" indicates that an upper arm is on and a "0" indicates that a lower arm is on. Therefore, for example, the voltage vector V2 corresponds to a case in which the upper arms of the U-phase 15 and the V-phase 16 are on and the lower arm of the W-phase 17 is on.

With rectangular wave voltage control, control that successively switches these voltage vectors V1 to V6 in one cycle of electrical angle is performed. Incidentally, in FIG. 3, the dotted line indicates the timing at which the switching state changes. The switching area A1 is an area in which the voltage vector is V3 (0, 1, 0), the switching area A2 is an area in which the voltage vector is V4 (0, 1, 1), and the switching area A3 is an area in which the voltage vector is V5 (0, 0, 1).

Figure 4:
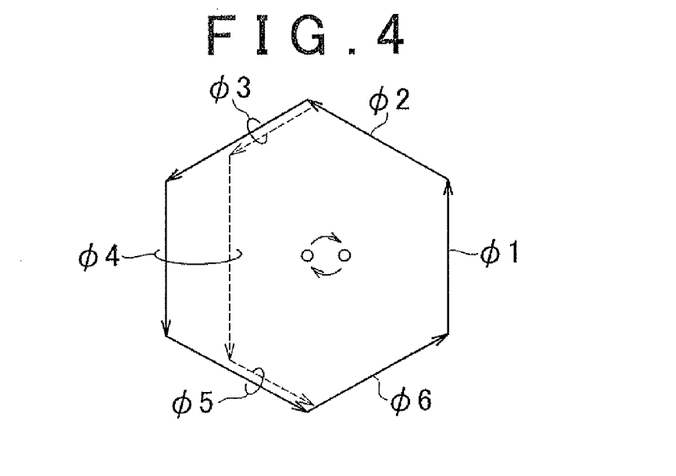
FIG. 4 is a view of a change in the flux linkage vector locus during the voltage phase update according to the first example embodiment.

FIG. 4 is a view of a change in the flux linkage vector locus during the voltage phase update. Referring to both FIGS. 3 and 4, the flux linkage vectors φ1 to φ6 correspond to the voltage vectors V1 to V6, respectively. The solid line in FIG. 4 indicates the flux linkage vector locus before the phase change, and the dotted line in FIG. 4 indicates the flux linkage vector locus after the phase change. FIG. 4 shows an example of the locus when the phase is advanced.

In this first example embodiment, the phase starts to be updated in the switching area A1 shown in FIG. 3. First in switching area A1, a phase of a desired amount according to the torque difference is advanced. The change in the flux linkage vector φ3 before and after the phase change indicates that the phase has advanced in switching area A1. Next in this first example embodiment, in switching area A2 which follows switching area A1, the phase is retarded by the amount that the phase advanced in switching area A1. The change in the flux linkage vector φ4 before and after the phase change indicates that the phase has been retarded in switching area A2. Then in switching area A3 which follows switching area A2, the phase is advanced by the amount that the phase advanced in switching area A1. The change in the flux linkage vector φ5 before and after the phase change indicates that the phase has advanced in switching area A3. This completes the phase update.

With this kind of phase updating method, the voltage phase is advanced by a desired amount according to the torque difference. Here, as is shown in FIG. 4, the center of the flux linkage vector locus during the phase update is temporarily with respect to the center of the flux linkage vector locus before the phase update, but after the phase update is complete, the center of the flux linkage vector locus returns to its original position (i.e., to the same position as before the phase update). That is, the center of the flux linkage vector locus after the phase update does not continue to be offset from the center of the flux linkage vector locus before the phase update. As a result, offset current can be suppressed. Also, with this phase updating method, the phase update is completed in half a cycle of electrical angle, so responsiveness is not greatly impeded.

Figure 5:
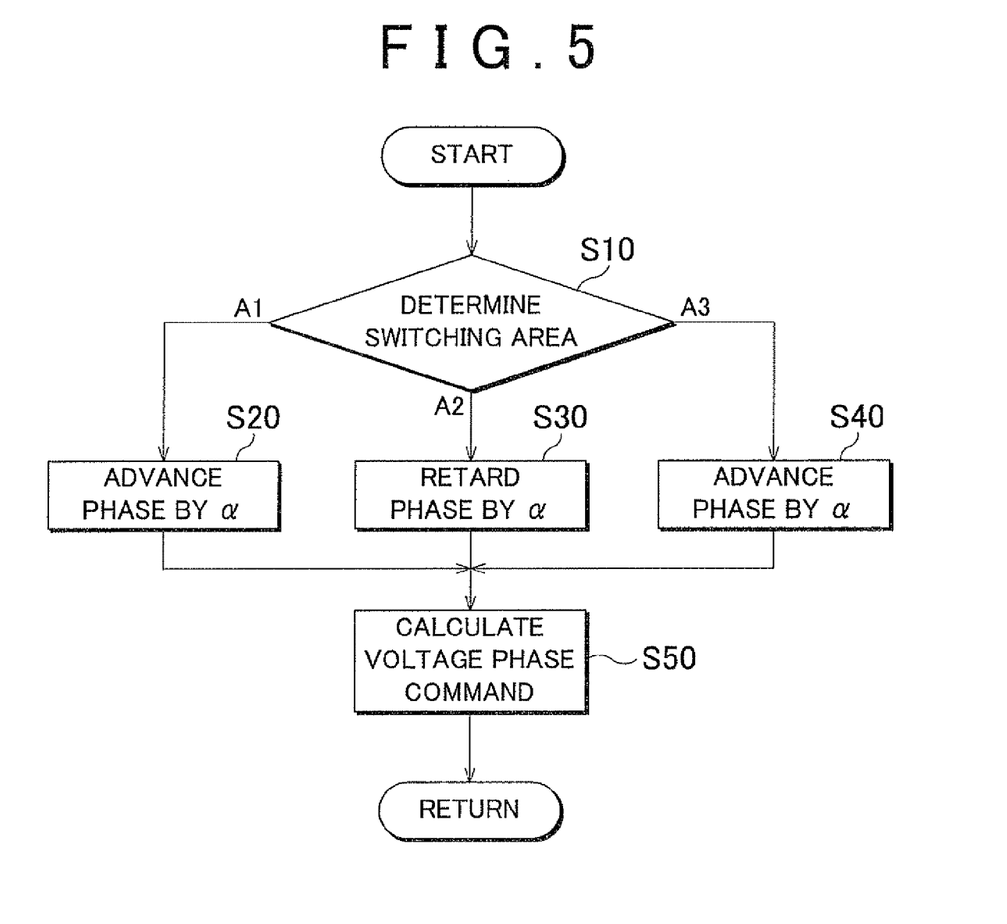
FIG. 5 is a flowchart illustrating a phase changing routine (when advancing) executed by the control apparatus in the first example embodiment shown in FIG. 1.

FIG. 5 is a flowchart illustrating a phase changing routine (when advancing) executed by the control apparatus 30 shown in FIG. 1. The routine illustrated in this flowchart is called up from a main routine and executed at predetermined intervals of time or each time a predetermined condition is satisfied.

Referring to FIG. 5, the control apparatus 30 first determines the switching area (step S10). If it is determined in step S10 that the switching area is A1 (FIG. 3) (i.e., "A1" in step S10), the control apparatus 30 advances the phase by a phase change amount α calculated by a feedback calculation according to the torque difference (step S20). Then, the control apparatus 30 calculates a voltage phase command based on that phase change amount (step S50).

If, on the other hand, it is determined in step S10 that the switching area is A2 (FIG. 3) (i.e., "A2" in step S10), the control apparatus 30 retards the phase by the phase change amount a advanced in step S20 (step S30). Then the control apparatus 30 proceeds on to step S50 where it calculates the voltage phase command.

Also, if it is determined in step S10 that the switching area is A3 (FIG. 3) (i.e., "A3" in step S10), the control apparatus 30 advances the phase by the phase change amount α advanced in step S20 (step S40). Then the control apparatus 30 proceeds on to step S50 where it calculates the voltage phase command.

Figure 6:
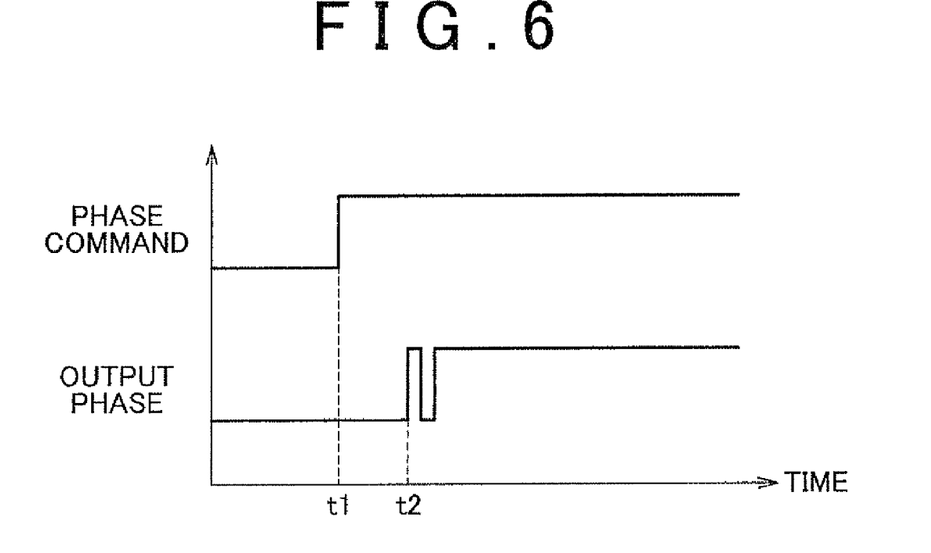
FIG. 6 is a timing chart showing the change over time in the voltage phase according to the first example embodiment.

FIG. 6 is a timing chart showing the change over time in the voltage phase. Referring to FIG. 6, the phase command is a command value calculated according to the torque difference. The output phase indicates the actual phase change. At time t1, the change in the phase (i.e., the advance angle) is specified based on the torque difference. Then at time t2, the phase is advanced according to the phase command, then temporarily returned at the next switching timing, and then advanced again at the next switching timing after that.

As described above, in this first example embodiment, when the phase of the rectangular wave voltage is updated, the center of the flux linkage vector locus after the phase update will not continue to be offset center of the flux linkage vector locus before the phase update because the phase is updated as described above. Therefore, according to this first example embodiment, offset current can be suppressed when updating the phase of the rectangular wave voltage in rectangular wave voltage control.

A first modified example of the first example embodiment described above aims to further suppress offset current by halving one phase change amount and repeating the phase changing routine executed in the first example embodiment twice.

Figure 7:
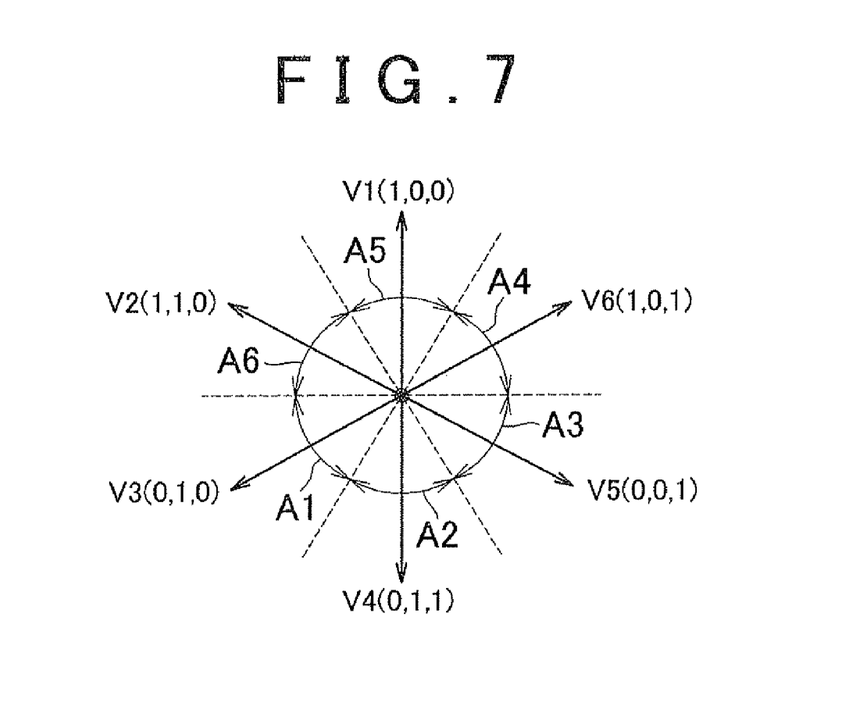
FIG. 7 is a view of phase vectors of the inverter according to a first modified example of the first example embodiment.

FIG. 7 is view of phase vectors of the inverter 14. Referring to FIG. 7, switching area A4 after switching area A3 is an area where the voltage vector is V6 (1, 0, 1), switching area A5 is an area where the voltage vector is V1 (1, 0, 0), and switching area A6 is an area where the voltage vector is V2 (1, 1, 0).

Figure 8:
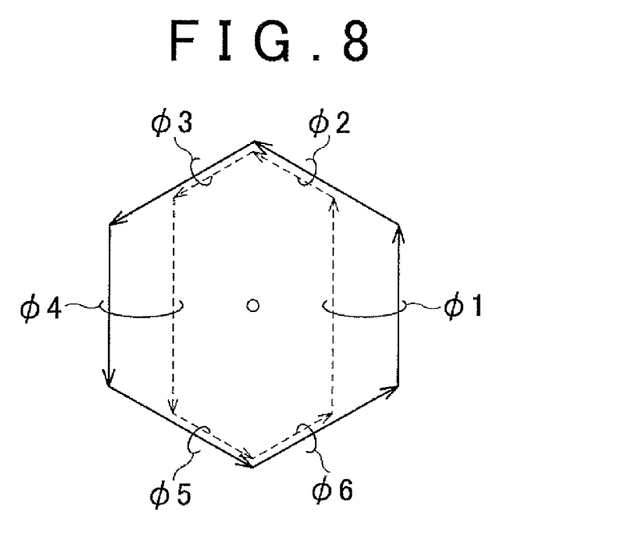
FIG. 8 is a view of a change in the flux linkage vector locus during a voltage phase update according to the first modified example in the first example embodiment.

FIG. 8 is a view of a change in the flux linkage vector locus during a voltage phase update according to the first modified example. Incidentally, FIG. 8 corresponds to FIG. 4 described in the first example embodiment, and just like FIG. 4, FIG. 8 also shows an example of the locus when the phase is advanced.

Referring to both FIGS. 7 and 8, in this first modified example as well, the phase starts to be updated in the switching area A1 shown in FIG. 7. Here in switching area A1, the phase is advanced by one-half of the phase change amount set according to the torque difference. Then in switching area A2, the phase is retarded by the amount of the phase advanced in switching area A1, and in switching area A3, the phase is advanced by the amount of the phase advanced in switching area A1.

Next in switching area A4 after switching area A3, the phase is advanced by the remaining phase change amount (i.e., one-half of the phase change amount set according to the torque difference). Then in switching area A5, the phase is retarded by the amount of the phase advanced in switching area A4, and in switching area A6, the phase is advanced by the amount of the phase advanced in switching area A4.

As a result, the voltage phase can be changed by a desired amount according to the torque difference, while the amount of offset in the center of the flux linkage vector locus can be reduced compared to when the phase updating method in the first example embodiment is used.

Figure 9:
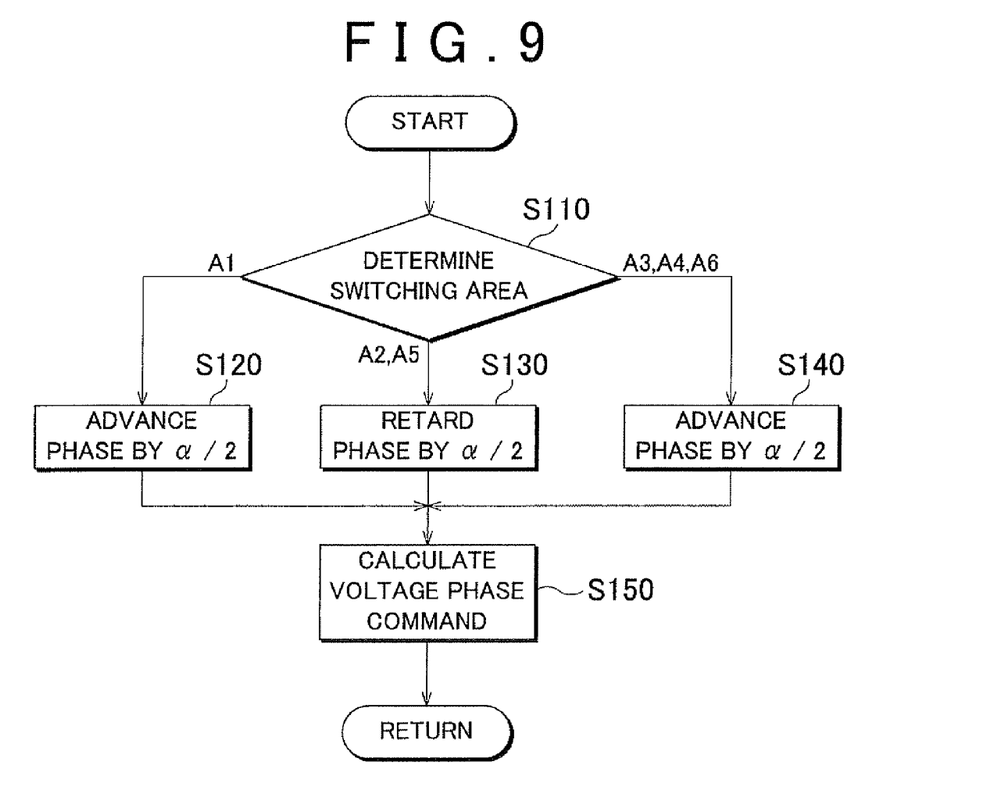
FIG. 9 is a flowchart illustrating a phase changing routine (when advancing) executed by the control apparatus according to the first modified example of the first example embodiment.

FIG. 9 is a flowchart illustrating a phase changing routine (when advancing) executed by the control apparatus 30 according to the first modified example. Incidentally, the routine illustrated in this flowchart as well is called up from a main routine and executed at predetermined intervals of time or each time a predetermined condition is satisfied.

Referring to FIG. 9, the control apparatus 30 first determines the switching area (step S110). If it is determined in step S110 that the switching area is A1 (FIG. 7) (i.e., "A1" in step S110), the control apparatus 30 advances the phase by one-half of the phase change amount a calculated by a feedback calculation according to the torque difference (step S120). Then the control apparatus 30 calculates a voltage phase command based on that phase change amount (step S150).

If, on the other hand, it is determined in step S110 that the switching area is A2 or A5 (FIG. 7) (i.e., "A2" or "A5" in step S110), the control apparatus 30 retards the phase by one-half of the phase change amount α advanced in step S120 (step S130). Then the control apparatus 30 proceeds on to step S150 where it calculates the voltage phase command.

Also, if it is determined in step S110 that the switching area is A3, A4, or A6 (FIG. 7) (i.e., "A3", "A4", or "A6" in step S10), the control apparatus 30 advances the phase by one-half of the phase change amount α advanced in step S120 (step S140). Then the control apparatus 30 proceeds on to step S150 where it calculates the voltage phase command.

Figure 10:
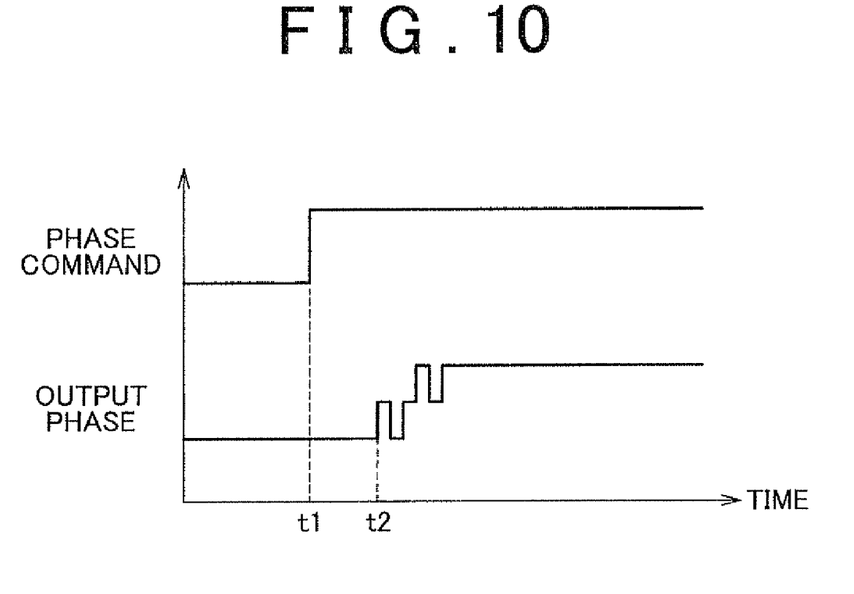
FIG. 10 is a timing chart showing the change over time in the voltage phase according to the first modified example of the first example embodiment.

FIG. 10 is a timing chart showing the change over time in the voltage phase. Referring to FIG. 10, at time t1 the change in the phase (i.e., the advance angle) is specified based on the torque difference. Then at time t2, the phase is first advanced by one-half of the phase command, then temporarily returned at the next switching timing, and then advanced again at the next switching timing after that. Furthermore, the phase is again advanced by one-half of the phase command at the next switching timing, then returned at the next switching timing after that, and again advanced at the next switching timing after that.

As described above, halving one phase change amount and repeating the phase changing routine twice as in this modified example reduces the amount of offset in the center of the flux linkage vector locus compared with when the phase changing method according to the first example embodiment is used. As a result, offset current can be suppressed even more.

Next, a second modified example of the first example embodiment will be described. In the first example embodiment and the first modified example thereof described above, the switching area where the phase starts to be updated is fixed when the voltage vector is V3 (0, 1, 0). However, in this second modified example, the switching area where the phase starts to be updated is variable so the phase can be updated in real time.

Figure 11:
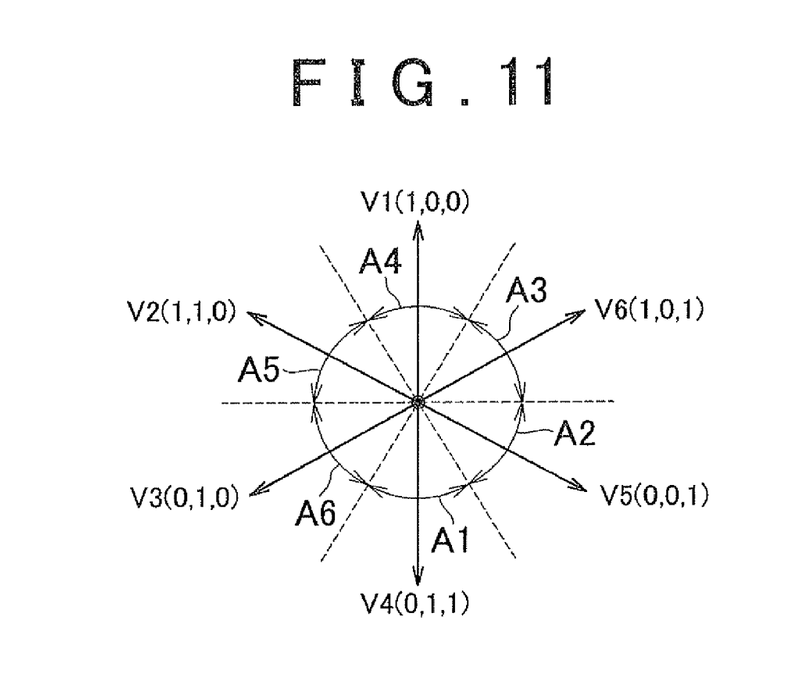
FIG. 11 is a view of voltage vectors of the inverter according to a second modified example of the first example embodiment.

FIG. 11 is a view of voltage vectors of the inverter 14. Referring to FIG. 11, the phase starts to be updated in response to a change in the phase command when the voltage vector is V4 (0, 1, 1) (i.e., in switching area A1), for example.

Figure 12:
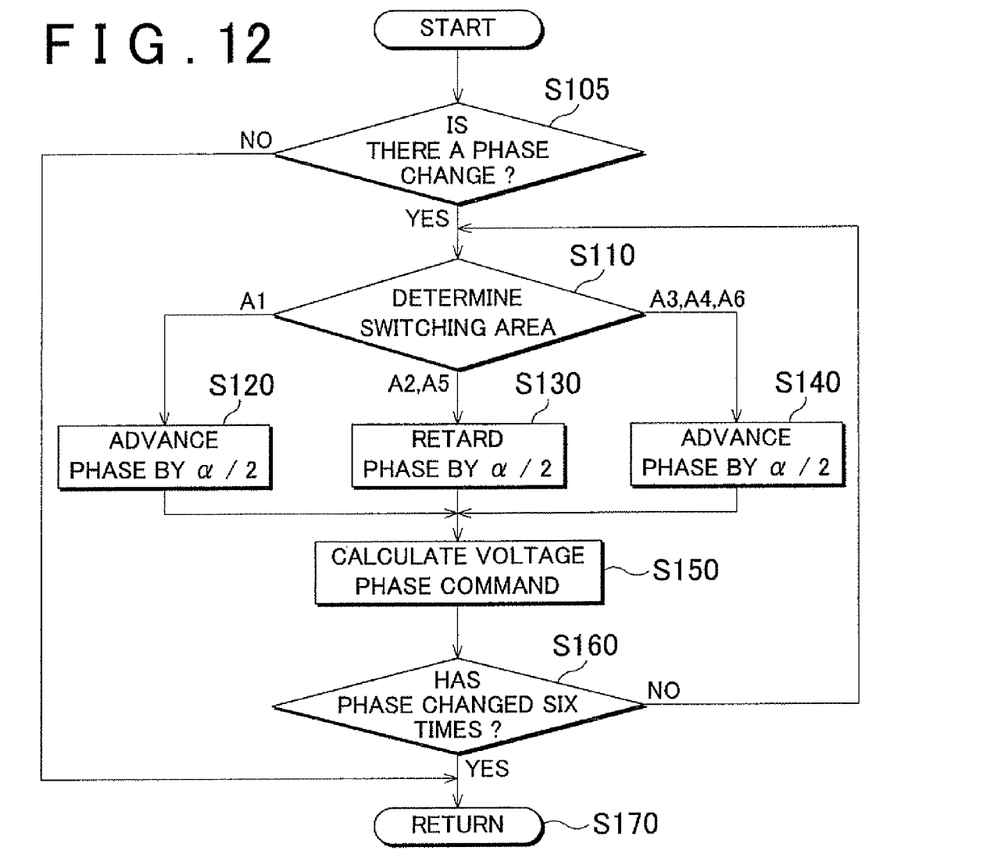
FIG. 12 is a flowchart of a phase changing routine (when advancing) executed by the control apparatus according to the second modified example of the first example embodiment.

FIG. 12 is a flowchart of a phase changing routine (when advancing) executed by the control apparatus 12 according to the second modified example. Incidentally, the routine illustrated in this flowchart as well is called up from a main routine and executed at predetermined intervals of time or each time a predetermined condition is satisfied.

The flowchart in FIG. 12 is similar to the flowchart illustrated in FIG. 9 with the addition of steps S105 and S160. That is, the control apparatus 30 first determines whether there is a change in the voltage phase (step S105). It is determined that there is a change in the voltage phase when, for example, the torque difference is larger than a predetermined value or the phase change amount calculated according to the torque difference is larger than a predetermined value.

If it is determined in step S105 that there is a phase change (i.e., YES in step S105), the control apparatus 30 proceeds on to step S110 and determines the current switching area. That switching area is determined to be A1 and a sequential phase change is made. If, on the other hand, it is determined in step S105 that there is no phase change (i.e., NO in step S105), the control apparatus 30 proceeds directly to step S170 without executing the steps in between.

Also, after the voltage phase command is calculated in step S150 based on the phase change amount, the control apparatus 30 determines whether the phase has changed six times (i.e., one set of six changes of the switching areas A1 to A6) (step S160). If it is determined that the phase has been changed six times (i.e., YES in step S160), the control apparatus 30 proceeds on to step S170. If it is determined in step S160 that the phase has not yet been changed six times (i.e., NO in step S160), the control apparatus 30 proceeds on to step S110 and the phase changing routine is continued.

As described above, with this second modified example, the switching area where the phase starts to be updated is variable, so the phase can be updated in real time.

Next, a second example embodiment of the invention will be described. In this second example embodiment, the phase is changed arbitrarily the first four of the six times that the voltage phase is changed in one cycle of electrical angle. The last or final two times, the voltage phase is updated such that the flux linkage vector returns to the starting point for when starting a phase update, i.e., such that flux linkage vector locus returns to its original hexagonal shape as a result of the last two phase changes. As a result, a freer phase change is able to be realized.

Figure 13:
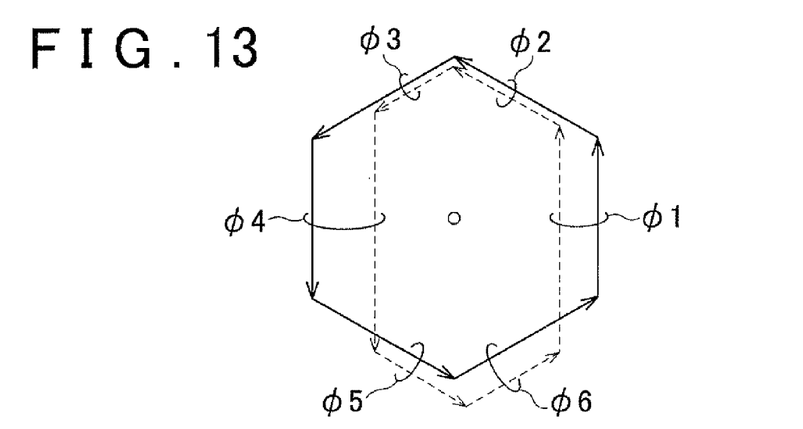
FIG. 13 is a view of a change in the flux linkage vector locus during a voltage phase update according to a second example embodiment of the invention.

FIG. 13 is a view of a change in the flux linkage vector locus during a voltage phase update according to the second example embodiment. Referring to both FIG. 7 and FIG. 13, the phase starts to be updated when the switching area is A1 (FIG. 7). The phase is changed arbitrarily in switching areas A1 to A4. Then in the phase changes in switching areas A5 and A6, the phase is changed such that the flux linkage vector locus returns to the hexagonal shape before the phase update.

Figure 14:
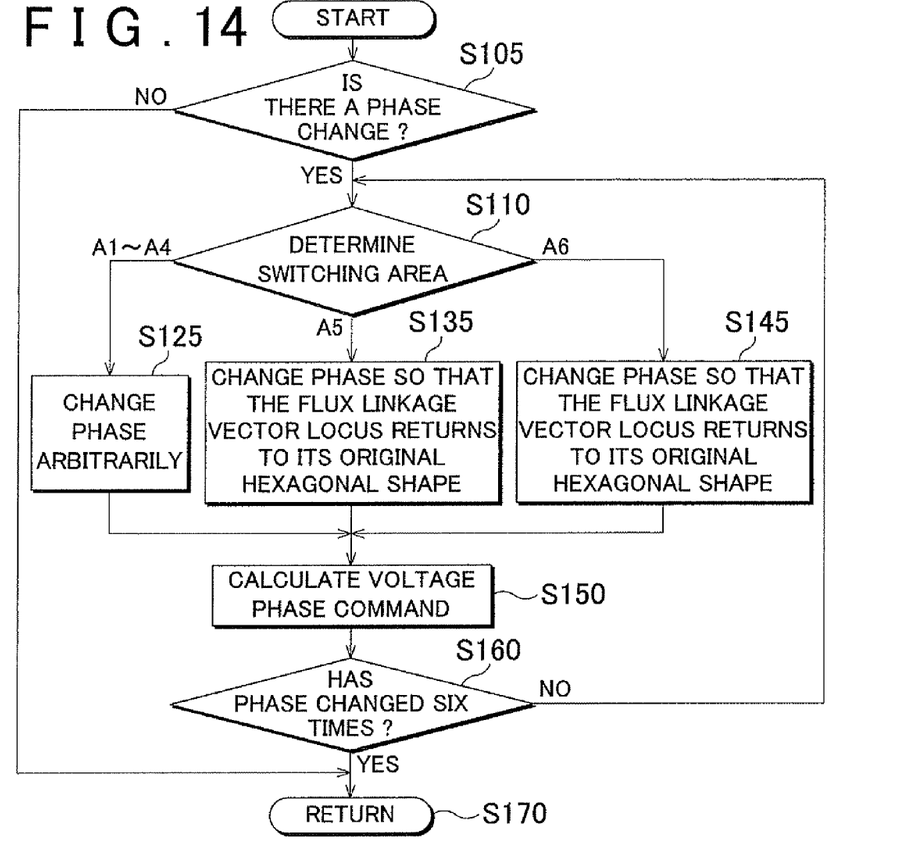
FIG. 14 is a flowchart illustrating a phase changing routine executed by the control apparatus according to the second example embodiment.

FIG. 14 is a flowchart illustrating a phase changing routine executed by the control apparatus 30 according to the second example embodiment. Incidentally, the routine illustrated in this flowchart as well is called up from a main routine and executed at predetermined intervals of time or each time a predetermined condition is satisfied.

Referring to FIG. 14, this flowchart is similar to the flowchart illustrated in FIG. 12 except that step S120 is replaced by step S125, step S130 is replaced by step S135, and step S140 is replace by step S145. If it is determined in step S110 that the switching area is A1 to A4 (FIG. 7) (i.e., "A1 to A4" in step S110), the control apparatus 30 can change the phase arbitrarily (step S125). Then the control apparatus 30 proceeds on to step S150 where the voltage phase command is calculated.

If, on the other hand, it is determined in step S110 that the switching area is A5 or A6 (FIG. 7) (i.e., "A5" or "A6" in step S110), the control apparatus changes the phase so that the flux linkage vector locus returns to its original hexagonal shape (i.e., the hexagonal shape before the phase update) (steps S135 and S145). Then the control apparatus proceeds on to step S150 where the voltage phase command is calculated.

As described above, with this second example embodiment, a freer phase change is able to be realized.

Next, a third example embodiment of the invention will be described. In the first example embodiment the phase is changed at half a cycle of electrical angle, but appropriate switching is unable to be performed if the phase change amount is too large.

Figure 15:
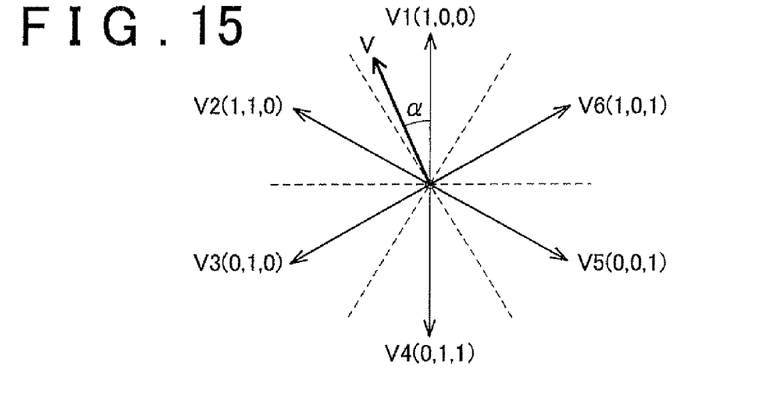
FIG. 15 is a view of voltage vectors of the inverter according to a third example embodiment of the invention.

FIG. 15 is a view of voltage vectors of the inverter 14. The dotted lines in FIG. 15 indicate the midpoints between adjacent voltage vectors. The switching state is switched at the timings of these dotted lines. If the phase change amount $\alpha$ exceeds 30° of electrical angle when the phase is changed in between switching timings, switching will no longer be able to be performed appropriately. Therefore, in this third example embodiment, a limit is provided for the phase change amount.

Figure 16:
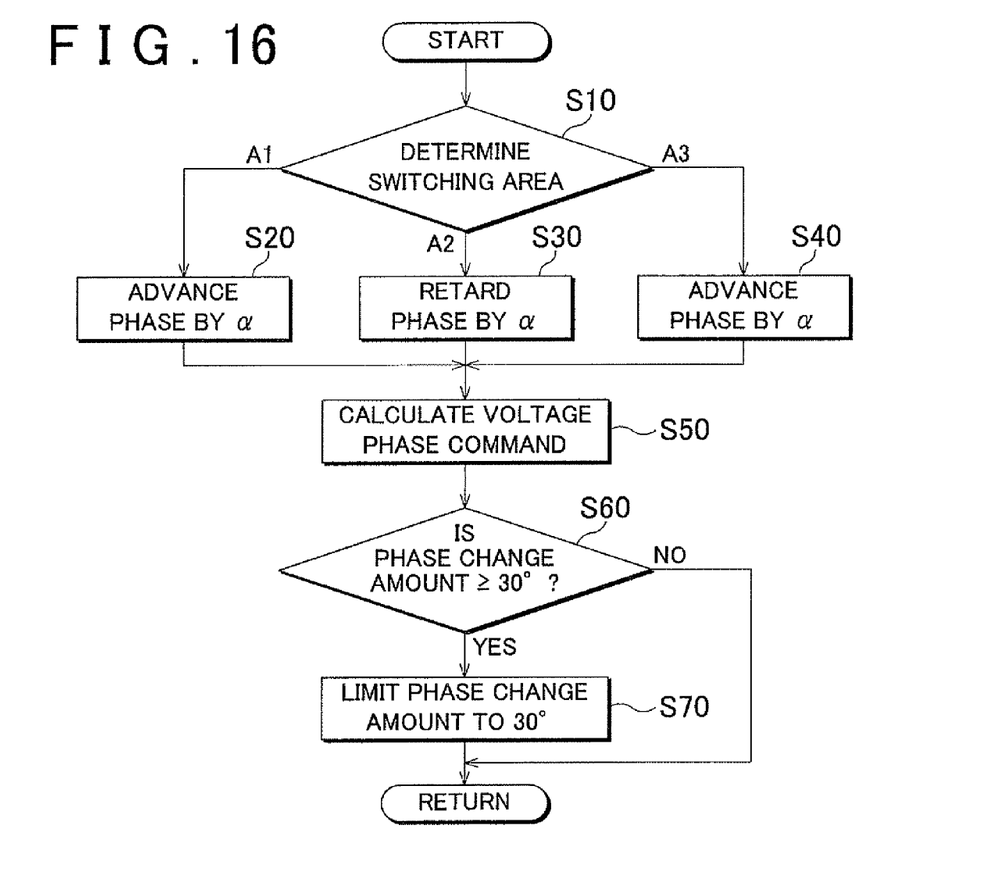
FIG. 16 is a flowchart illustrating a phase changing routine (when advancing) executed by the control apparatus according to the third example embodiment.

FIG. 16 is a flowchart illustrating a phase changing routine (when advancing) executed by the control apparatus 30 according to the third example embodiment. Incidentally, the routine illustrated in this flowchart as well is called up from a main routine and executed at predetermined intervals of time or each time a predetermined condition is satisfied.

The flowchart in FIG. 16 is similar to the flowchart illustrated in FIG. 5 with the addition of steps S60 and S70. That is, once the voltage phase command is calculated in step S50, the control apparatus 30 determines whether the phase change amount $\alpha$ is equal to or greater than a 30° electrical angle (step S60). If it is determined that the phase change amount $\alpha$ is equal to or greater than 30° (i.e., YES in step S60), the control apparatus 30 limits the phase change amount to 30° (step S70).

In this way, this third example embodiment limits the phase change amount, thereby preventing inappropriate switching from being performed.

Next, a fourth example embodiment of the invention will be described. In the third example embodiment, the phase is only able to change up to a 30° electrical angle. Therefore, in the fourth example embodiment the phase can be changed up to a 60° electrical angle by varying the timing of the phase change.

Figure 17:
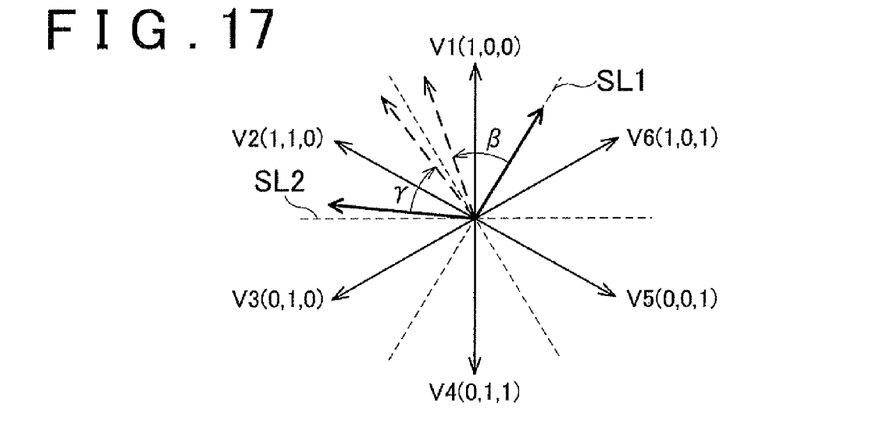
FIG. 17 is a view of voltage vectors of the inverter according to the third example embodiment.

FIG. 17 is a view of voltage vectors of the inverter 14. Referring to FIG. 17, as an example, when the voltage vector command V reaches a first switching line SL1, the voltage phase is advanced by $\beta$. Then right before the voltage vector command V reaches a second switching line SL2, the voltage phase is retarded by γ. This kind of phase operation enables the phase to be changed up to (but not including) a 60° electrical angle.

Figure 18:
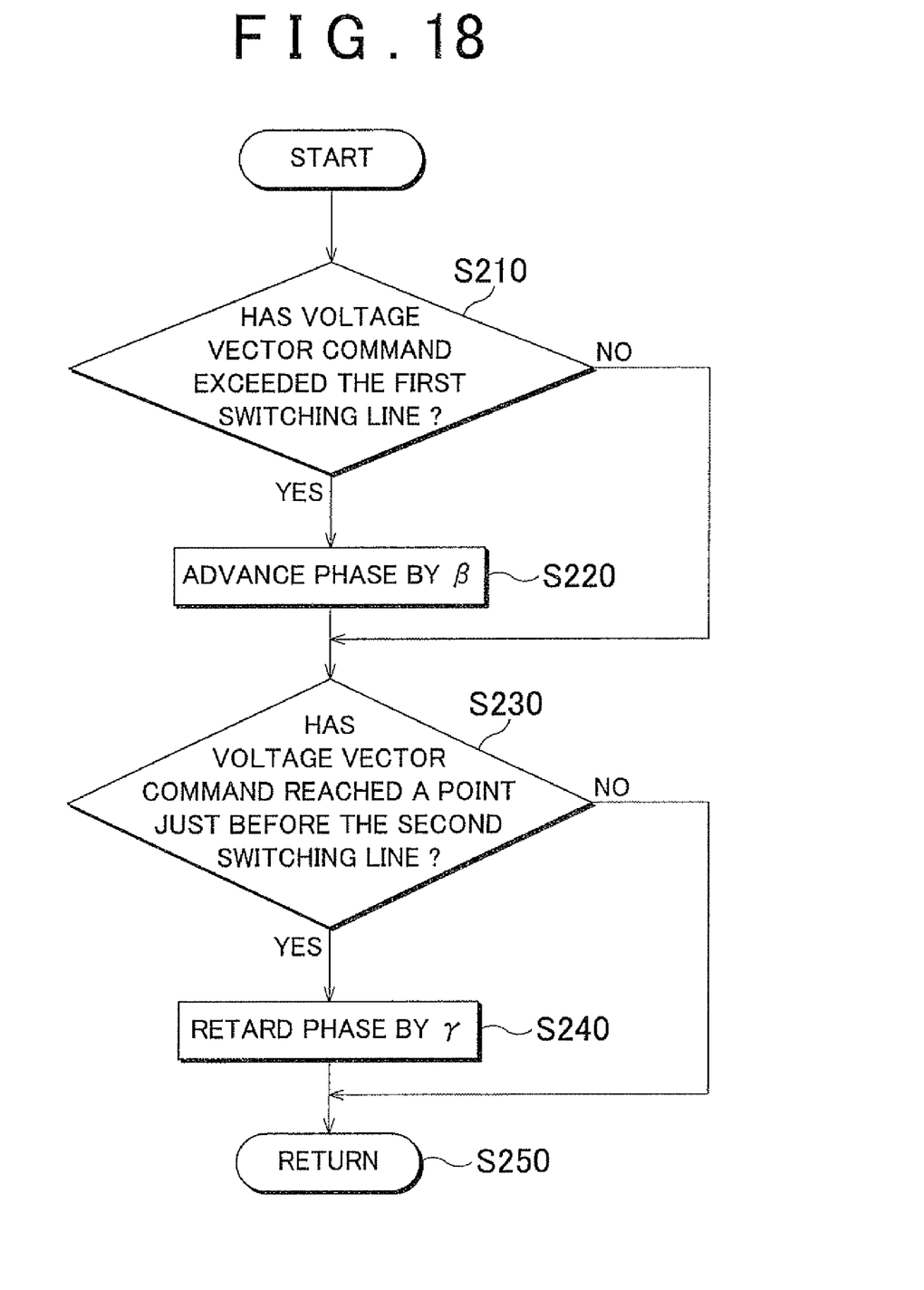
FIG. 18 is a flowchart illustrating a phase changing routine executed by the control apparatus according to a fourth example embodiment of the invention.

FIG. 18 is a flowchart illustrating a phase changing routine executed by the control apparatus 30 according to the fourth example embodiment. Incidentally, the routine illustrated in this flowchart as well is called up from a main routine and executed at predetermined intervals of time or each time a predetermined condition is satisfied.

Referring to FIG. 18, the control apparatus 30 determines whether the voltage vector command has exceeded the first switching line SL1 (FIG. 17) (step S210). If it is determined that the voltage vector command has exceeded the first switching line SL1 (i.e., YES in step S210), the control apparatus 30 immediately advances the voltage phase by β (step S220). Incidentally, if it is determined in step S210 that the voltage vector command does not exceed the first switching line SL1 (i.e., NO in step S210), the control apparatus 30 proceeds directly on to step S230 without executing step S220.

Next, the control apparatus determines whether the voltage vector command has reached a point just before the second switching line SL2 (FIG. 17) (step S230). If it is determined that the voltage vector command has reached a point just before just the second switching line SL2 (i.e., YES in step S230), the control apparatus 30 retards the voltage phase by γ (step S240). Incidentally, if it is determined in step S230 that the voltage vector command has not reached a point just before the second switching line SL2 (i.e., NO in step S230), the control apparatus proceeds directly on to step S250 without executing step S240.

As described above, with this fourth example embodiment, the phase can be changed up to a 60° electrical angle by varying the timing of the phase change.

Incidentally, in each of the example embodiments described above, a structure in which the DC voltage generating portion 10# of the motor drive system includes the converter 12 so that the voltage input to the inverter 14 can be variably controlled is described as a preferable structure. However, as long as the voltage input to the inverter 14 can be variably controlled, the structure of the DC voltage generating portion 10# is not limited to that shown in FIG. 1. Also, it is not absolutely essential that the voltage input to the inverter be variable. That is, the invention may also be applied to a structure in which the output voltage of the power storage device B is input to the inverter 14 as it is (e.g., a structure in which the converter 12 is omitted).

Furthermore, in this example embodiment, it is assumed that the alternating-current motor that is the load on the motor drive system 100 is a permanent-magnet motor provided for driving a vehicle powered partly or entirely by electricity (such as a hybrid vehicle or an electric vehicle). However, the invention may also be applied to a structure in which the load is any appropriate alternating-current motor that can be used in other equipment.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A control apparatus for an alternating-current motor that is driven by an inverter, comprising:
a rectangular wave voltage control portion that generates a control command of the inverter such that rectangular wave voltage that has been phase-controlled to make the alternating-current motor operate according to a torque command value is applied to the alternating-current motor; and
a phase change control portion that controls a change in the phase to maintain the center of a flux linkage vector locus indicative of a change in a flux linkage of the alternating-current motor before and after a change in the phase of the rectangular wave voltage.

2. The control apparatus according to claim 1, wherein the phase change control portion is structured so as to be able to change the timing at which the phase is changed.

3. The control apparatus according to claim 2, wherein the phase change control portion sets an upper limit value of a change amount of the phase of the rectangular wave voltage.

4. The control apparatus according to claim 3, wherein the phase change control portion controls the change in the phase of the rectangular wave voltage by limiting the amount of change in the phase to the upper limit value when the amount of change in the phase of the rectangular wave voltage has exceeded the upper limit value.

5. The control apparatus according to claim 1, wherein the phase change control portion sets an upper limit value for the amount of change in the phase of the rectangular wave voltage.

6. The control apparatus according to claim 5, wherein the phase change control portion controls the change in the phase of the rectangular wave voltage by limiting the amount of change in the phase to the upper limit value when the amount of change in the phase of the rectangular wave voltage has exceeded the upper limit value.

* * * * *